(12) United States Patent
Aalto et al.

(10) Patent No.: US 7,386,196 B2
(45) Date of Patent: Jun. 10, 2008

(54) METHOD FOR CONTROLLING AN OPTOELECTRONIC COMPONENT

(75) Inventors: Timo Aalto, Helsinki (FI); Markku Kapulainen, Espoo (FI); Mikko Harjanne, Helsinki (FI); Markku Rono, Espoo (FI)

(73) Assignee: Valtion Teknillinen Tutkimuskeskus, Espoo (FI)

( * ) Notice: Subject to any disclaimer, the term of this patent is extended or adjusted under 35 U.S.C. 154(b) by 437 days.

(21) Appl. No.: 10/526,477

(22) PCT Filed: Sep. 4, 2003

(86) PCT No.: PCT/FI03/00649

§ 371 (c)(1),
(2), (4) Date: Sep. 27, 2005

(87) PCT Pub. No.: WO2004/023196

PCT Pub. Date: Mar. 18, 2004

(65) Prior Publication Data

US 2006/0088239 A1 Apr. 27, 2006

(30) Foreign Application Priority Data

Sep. 4, 2002 (FI) .................................. 20021583

(51) Int. Cl.
G02F 1/035 (2006.01)
(52) U.S. Cl. ...................... 385/2; 385/3; 385/8; 385/14
(58) Field of Classification Search ................ 385/1–3, 385/8, 10, 14, 16
See application file for complete search history.

(56) References Cited

U.S. PATENT DOCUMENTS

| | | | |
|---|---|---|---|
| 5,173,956 A | 12/1992 | Hayes | |
| 5,359,449 A * | 10/1994 | Nishimoto et al. | 398/198 |
| 6,215,918 B1 | 4/2001 | Keil et al. | |
| 6,233,070 B1 | 5/2001 | Lu et al. | |
| 6,236,774 B1 * | 5/2001 | Lackritz et al. | 385/14 |
| 6,278,822 B1 | 8/2001 | Dawnay | |
| 6,351,578 B1 | 2/2002 | Brinkman et al. | |
| 6,882,760 B2 * | 4/2005 | Takabayashi et al. | 385/11 |
| 2002/0037129 A1 * | 3/2002 | Brinkman et al. | 385/16 |

FOREIGN PATENT DOCUMENTS

| | | |
|---|---|---|
| EP | 0 674 210 | 9/1995 |
| JP | 59-148031 | 8/1984 |
| WO | WO98/14826 | 4/1998 |
| WO | WO01/16648 | 3/2001 |

* cited by examiner

Primary Examiner—Frank G. Font
Assistant Examiner—Hung Lam
(74) Attorney, Agent, or Firm—Young & Thompson

(57) ABSTRACT

A method for controlling an optoelectronic component that includes two waveguides. The refractive index of the first waveguide is changed periodically with a first control signal, the amplitude of which is changed between a first amplitude level and higher second amplitude level. The refractive index of the second waveguide is changed periodically with a second control signal, the amplitude of which is changed between the aforementioned first amplitude level and a lower third amplitude level. When the control signals are on their common first amplitude level, the refractive indices of the waveguides are equal and the phase difference between them is zero. When the first control signal is on the second amplitude level and the second control signal on the third amplitude level, the refractive indices of the waveguides are unequal so that their mutual phase difference has a predetermined target value.

20 Claims, 5 Drawing Sheets

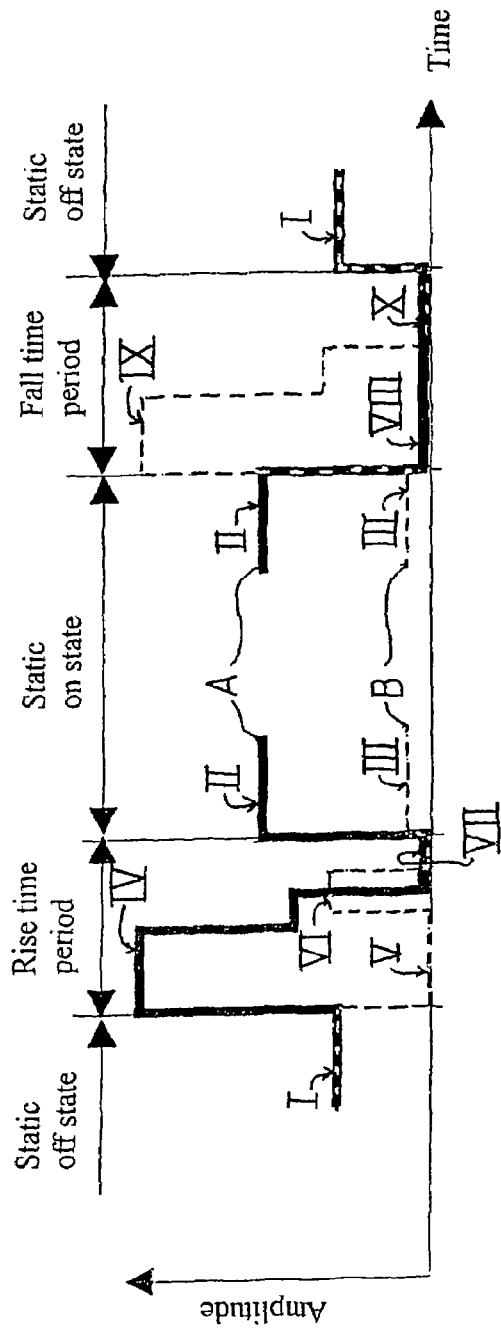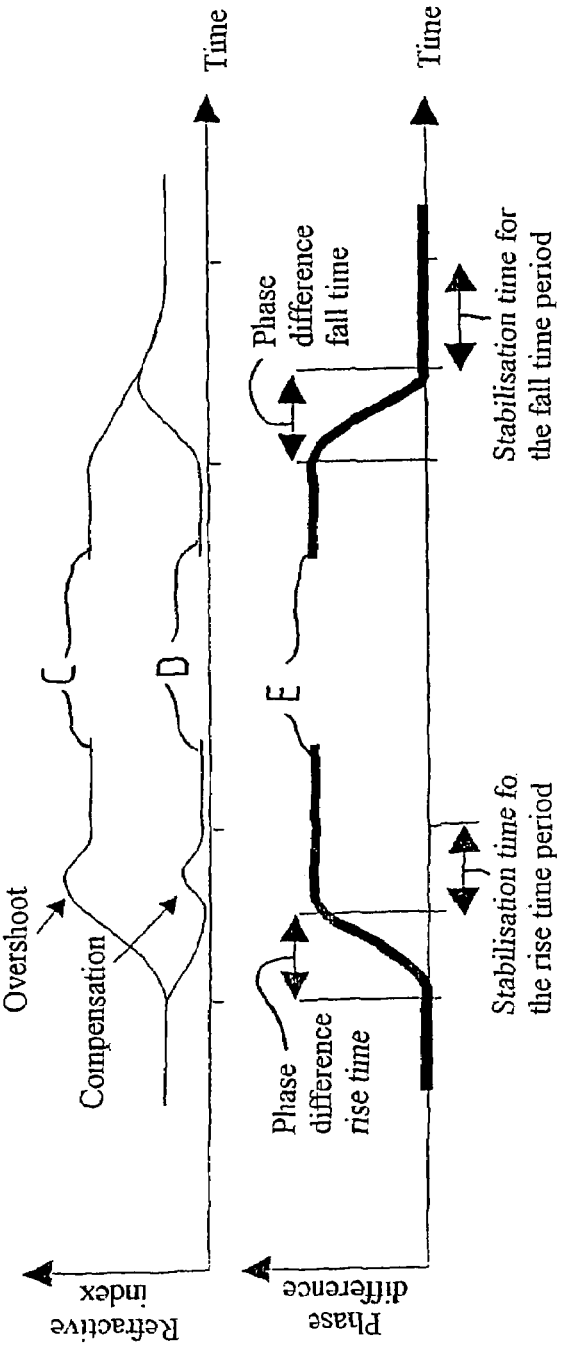
Fig 5
Fig 6
Fig 7

METHOD FOR CONTROLLING AN OPTOELECTRONIC COMPONENT

FIELD OF THE INVENTION

The invention relates to optoelectronics and the subject of the invention is the method described in the preamble of claim 1.

BACKGROUND OF THE INVENTION

In some optical applications, there is a need to change the phase difference between two waveguides, such as waveguides on planar substrates or the like (e.g. optical fibers) as fast as possible. The phase difference can be tuned by changing the optical length (length times the refractive index) in either one or both waveguides so that the optical length difference between them changes.

For example, in an optical 2×2 switch based on a Mach-Zehnder interferometer (MZI), as seen in FIG. 1, a phase difference change between two adjacent waveguides 3 and 4 in the area between directional couplers 16 and 17, induced by heating, makes the switch shift back and forth between the bar and cross states. In the bar state (on-state), the optical power coming from one input is directed to the output of the same waveguide, while in the cross state (off-state) the same power is directed to the output of the adjacent waveguide. If both directional couplers 16 and 17 of the inputs and outputs of the switch are ideal 50:50 power splitters, then the switch is in a cross state (off-state) when the phase difference is 0° (±N·360°) and in a bar state (on-state), when the phase difference is 180° (±N·360°). Between the bar and cross states, the coupling state of the switch changes as a cosine function of the phase difference. If directional couplers are non-ideal 50:50 power splitters, then at least one of the bar and cross states is only partial, in which case such a partial coupling state the output power of neither waveguide is zero and the optical power is split to both outputs in a certain proportion. When the directional couplers 16 and 17 are lossless and mutually identical, the transmission $T_x$ of a waveguide that is crosswise with respect to the input is as a function of the phase difference $\Delta\phi$ according to $$T_x = \frac{1}{2}\sin^2(\pi r/2)[1 + \cos(\Delta\phi)],$$

where r is the length of the directional coupler in relation to its ideal length. The transmission of the bar state is $T_\parallel = 1 - T_x$. By using only one input or output port of the aforementioned switch, or by using a symmetrical 1×1 Mach-Zehnder interferometer operating in the same manner, one can realise e.g. a tunable attenuator or an on/off switch. With similar structures one can also realise e.g. tunable wavelength filters.

FIG. 2 represents a schematic cross-section of a known switch, which was already illustrated in FIG. 1. In this example, waveguides 3 and 4 are so called silicon-on-insulator (SOI) waveguides. The switch includes a substrate 12 made of silicon (Si) and which is, in this example, approx. 0.5 mm thick. On top of the substrate 12 lies a thin $SiO_2$ layer 13, which is 1 μm thick. On top of the $SiO_2$ layer 13 is an approx. 5 μm thick silicon slab (Si) 14 covering the whole surrounding of the waveguides. The waveguides 3, 4 are defined by local ridges. Along the ridges the thickness of the silicon layer 14 is 10 μm. On top of the silicon layer 14 is a 1 μm thick $SiO_2$ layer 15. Along the waveguides in positions illustrated in FIG. 1, there are 0.5 μm thick heating resistors 5 and 6 on top of the $SiO_2$ layer 15. The ridge acts as a waveguide and the field, illustrated by the dashed line, propagates along the ridge. Horizontally the waveguide is only bound by the steps, so that the silicon slab 14 extends all the way to the other waveguide. The light remains in the position of the ridge and propagates along the ridge.

For controlling an optoelectronic component, two different methods are previously known. These methods are schematically illustrated in FIGS. 3 and 4.

FIG. 3 represents a control signal amplitude of the switch as a function of time, when only one of the two adjacent waveguides is modulated with this first control signal, which is electric and substantially rectangular, and which produces a change in the refractive index (that is, in optical length change) and, thus, produces a phase difference between the waveguides. The amplitude of the first control signal is represented in FIG. 3 by a thick black line. The phase difference induced between the waveguides is represented by a dotted line. In the off-state of the switch the amplitude of the first control signal is zero and in the on-state it is in such a value that the optical length of the modulated waveguide has become shorter or longer by half a wavelength (phase difference 180°).

FIG. 4 illustrates another previously known method, which is an alternative to the method illustrated in FIG. 3, where one of the waveguides is being modulated with an electric control signal that substantially consists of two rectangular parts. In this method, the phase difference between the two waveguides can be raised from zero to the desired target value faster than in the previously described first known method. The higher and substantially rectangular first part of the control signal induces a very fast temperature rise in one of the waveguides, because its peak amplitude is significantly higher than what is needed to maintain the waveguide in its target temperature. Compared to the first known method, this method consumes more power, but it has the advantage of faster rise time.

The methods represented by FIGS. 3 and 4 represent the technology which is closest to the invention and correspond to the preambles of claims 1 and 6. According to the known methods, the refractive index of the first waveguide is changed periodically with the first control signal, the amplitude of which is changed periodically between a first amplitude level I, which is substantially zero, and a second amplitude level II, which is higher than the first amplitude level. In the beginning of the rise time period the amplitude of the first control signal can go to a fourth amplitude level (IV), which is distinctly higher than the second amplitude level. When the first control signal is on the first amplitude level I, which is substantially zero, the refractive indices of the first and second waveguide are equal and the phase difference between them is zero. When the first control signal is on the second amplitude level II, the refractive indices of the first and second waveguide are unequal so that the phase difference is in a predetermined target value. In the rise time period of the phase difference the first amplitude level I forms a start level for the first control signal and the second amplitude level II forms its target level. Similarly, in the fall time period of the phase difference the second amplitude level II forms a start level for the first control signal and the first amplitude level I forms its target level.

Furthermore, it is known that the optical length of a waveguide (and the phase of the light propagating along the waveguide) can be changed e.g. by heating, stressing or bending the waveguide, by producing an electric field into the waveguide or by injecting current through the waveguide. Different modulation mechanisms have their advantages and disadvantages with respect to e.g. speed, optical attenuation, electric power consumption, necessary modulation length and costs.

Known thermo-optical switches usually operate with frequencies reaching up to 1 kHz, at the most, but they are relatively simple and inexpensive to fabricate. Their modulation speed is limited by the heat conduction from the heating resistor to the waveguide core and onwards away from the core, as well as by the heat capacity of the waveguide. In general, heating is more efficient and faster when the volume to be heated is smaller. Good thermal conductivity away from the waveguide, e.g. to an underlying cooled substrate, makes the modulation faster, but it also increases the electric power consumption. If a waveguide is small and efficiently thermally insulated from the surrounding, it can heat up fast but cool down slowly. In general, thermo-optical switches heat up significantly faster than they cool down. However, a silicon-on-insulator (SOI) waveguide represented in FIG. 2, for example, heats up and cools down almost as fast, because the heat efficiently spreads along the horizontal silicon and then conducts from a broad area through the thin oxide layer into the silicon substrate. Experiments have shown that due to the good thermal conductivity in SOI-waveguides, the back and forth 180° phase difference changes can be obtained with frequencies reaching up to 10 kHz, which is somewhat faster than in the commercial thermo-optic switches. While modulating one waveguide, the heating power is then approx. 0.3-0.4 W in the on-state and 0 W in the off-state, which is still quite reasonable. The temperature of the waveguide stabilises exponentially, so that, for example, a 90% modulation can be obtained much faster than a 99% modulation.

Furthermore, it is known that a control signal can be used to create an electric field into the waveguide or to produce an electrical current through the waveguide, which enables the realisation of significantly faster switches, but also these have some typical disadvantages, such as higher optical attenuation and higher costs of the technology. These methods also have a finite delay that limits the modulation speed.

Publication U.S. Pat. No. 5,173,956 describes an optical switch in which the refractive index is controlled by injecting electric current through the material for obtaining internal heating. The publication mentions that the associated switch can reach 1 MHz switching speed. As mentioned above, current injection has the disadvantage of increased optical attenuation.

Publication U.S. Pat. No. 6,278,822 involves an apparatus where there are different materials between two waveguides and a current injected through the materials simultaneously heats up one waveguide and cools down the other waveguide by exploiting the Peltier effect. When applied to an optical switch, this solution can reach 10 MHz switching speed. The disadvantage of this method is that it requires significant changes in the switching structure and cannot, therefore, improve the switching speeds of existing switches.

Publication U.S. Pat. No. 6,351,578 describes an optical switch where the refractive index is changed by heating it with a first control signal that is illustrated in FIG. 4. The operation of the associated switch is not particularly sensitive to the exact values of the control signal amplitudes, because the refractive index change of the switch only needs to exceed a given threshold value for deflecting light out of the waveguide. The method only reduces the rise time of the switch and it has not been applied for changing the phase difference between two adjacent waveguides or for accurate tuning of the refractive index.

PURPOSE OF THE INVENTION

The purpose of the invention is to provide a method for changing the phase difference between two waveguides, such as waveguides on planar substrates or the like, significantly faster than the known methods, and without the need for any structural changes in the component. When the optoelectronic component is, for example, an optical switch, its switching speed can be substantially increased.

SUMMARY OF THE INVENTION

The method of the invention is characterised in what is disclosed in claims 1 and 6.

According to the invention, for changing the phase difference between the waveguides fast from one desired value to another, the first waveguide is heated with a first control signal and the second waveguide is heated with a second control signal, so that during this phase difference change, namely the rise or fall time period, both control signals are changed between their start and target levels so that the phase difference change is obtained significantly faster than what is possible by using only one (first) control signal and already before the refractive indices of the waveguides are stabilised.

According to the invention, both waveguides are heated with the same heating power during an off-state so that the first and second control signals are on a common first amplitude level (I), which is higher than zero. Then the phase difference between waveguides is zero. Similarly, during an on-state the first waveguide is heated with a higher heating power, corresponding to a second amplitude level (II), and the second waveguide is heated with a lower heating power, corresponding to a third amplitude level (III). The third amplitude level can be zero, but in one embodiment of the invention, it can also be higher than zero.

According to the invention, for reducing the phase difference rise time period, the amplitude of the first control signal is adjusted from its start level, namely the first amplitude level (I), to a fourth amplitude level (IV), which is higher than its target level, before it is adjusted to its target level, namely the second amplitude level (II), and simultaneously the amplitude of the second control signal is lowered from its start level, namely the first amplitude level (I), to its target level, namely the third amplitude level (III). Then the fast temperature rise of the first waveguide is combined with the temperature fall of the second waveguide, which leads to a faster phase difference change than what can be reached by using only one control signal. Additionally, the first waveguide control signal is used to compensate for the slow final cooling of the second waveguide so that during the final part of the rise time period both waveguides still slowly cool down towards their own target temperatures, while their mutual phase difference has already reached its target value and settled to it.

According to the invention, for reducing the phase difference fall time, the amplitude of the first control signal is lowered from its start level, namely the second amplitude level (II), to an eighth amplitude level (VIII), which is lower than its target level, before it is adjusted to its target level, namely the first amplitude level (I), and simultaneously the amplitude of the second control signal is adjusted from its start level, namely the third amplitude level (III), to a ninth amplitude level (IX), which is higher than its target level, before it is adjusted to its target level, namely the first amplitude level (I). Then the temperature fall of the first waveguide is combined with a rapid temperature rise of the second waveguide, which leads to a faster phase difference change than what can be reached by using only one control signal. Additionally, the second control signal is adjusted so that at the last part of the fall time period the first and second waveguide cool down together so that both waveguides still slowly cool down towards their common target temperature, while their mutual phase difference has already reached its target value, namely zero, and settled to it.

The method according to the invention has the advantage that it can be used to change the phase difference between two waveguides, such as waveguides on planar substrates or the like, significantly faster than what is possible by using known methods, and this can be achieved simply by using appropriate control signal modulation without any structural changes in the component. Thus, the operation of existing optoelectronic components can be enhanced simply by modifying their electric control signals to operate according to the invention. The amplitudes of the control signals are not simply set to their desired target levels, as in a traditional manner (see FIG. 3), but the phase difference changes (rise and fall time periods) are implemented with fast control signals that vary as their power is concerned. Additionally, according to the invention, the phase modulation efficiently exploits the temperature changes that appear simultaneously in both waveguides, and that together accelerate phase difference changes and enable the phase difference to settle to its target level already clearly before the waveguide temperatures are settled. Then the phase difference can be changed to its desired value as fast as possible and the phase difference change can be made as step-wise as possible. In one embodiment of the method, for reducing the phase difference rise time the fourth amplitude level of the first control signal is chosen so high that the phase difference clearly tends to rise above its predetermined target value, leading to a so-called overshoot of the refractive index. For compensating the overshoot the amplitude of the second control signal is raised to a sixth amplitude level, which is higher than the fifth amplitude level.

In one embodiment of the method, for reducing the phase difference rise time the amplitude of the first control signal is set to a seventh amplitude level (VII), which is lower than the second amplitude level, before it is set to its target value, namely the second amplitude level.

In one embodiment of the method, for reducing the phase difference fall time the amplitude of the second control signal is lowered from the ninth amplitude level to a tenth amplitude level, which is lower than the first amplitude, before it is set to its target level, namely the first amplitude level.

In one embodiment of the method, for reducing the phase difference fall time, the tenth amplitude level is chosen to be substantially equal to the eighth amplitude level.

In one embodiment of the method, the third amplitude level, fifth amplitude level, seventh amplitude level, eighth amplitude level and/or tenth amplitude level are chosen to be zero.

In one embodiment of the method, the third amplitude level is chosen to be higher than zero. In particular, this can be used to further accelerate the cooling of the second waveguide to its target level at the last part of the rise time period.

In one embodiment of the method, the phase difference between the first and second waveguide is modulated with at least two or more successive phase modulators.

In one embodiment of the method, the successive modulators are guided to operate in turn.

In one embodiment of the method, only some of the intended successive phase difference changes are implemented with the control signals of a given first modulator. Other phase difference changes are implemented with the control signal(s) of another modulator(s), which lie(s) successively with respect to the first modulator, so that the phase difference changes induced by the successive modulators sum up. Then the next phase difference change can be implemented with the next modulator immediately after the implementation of the previous phase difference change, although the refractive indices of the waveguides associated with the previous modulator are not yet settled to their target levels.

In one embodiment of the method, at least two successive modulators are mutually different, so that the first modulator is significantly faster and consumes more power than the second modulator, so that the first modulator is used for implementing fast and/or successive phase difference changes and the second modulator is used for implementing slow and/or single phase difference changes as well as long static operating states, so that the average power consumption is significantly smaller than what can be obtained by using only the first modulator, and the maximum modulation speed is significantly higher than what can be obtained by using only the second modulator.

In one embodiment of the method, the control signals are optimised during the rise and/or fall time periods so that they depend, not only on the start and target levels of the given intended phase difference, but also on at least one phase difference level that precedes the start level and/or succeeds the target state of the phase difference, so that the optimisation takes into account such a potential settling time that immediately precedes and/or succeeds the given phase difference change, and during which settling time the phase difference has already reached its target value, while the refractive indices of the waveguides have not yet settled.

In one embodiment of the method, the target value of the phase difference is set to approx. 180°.

In one embodiment of the method, the waveguides are realised on planar substrates.

In one embodiment of the method, the waveguides are chosen to be one of the following: SOI (silicon-on-insulator) waveguides, glass waveguides, polymer waveguides, compound semiconductor waveguides.

In one embodiment of the invention, the optoelectronic component is chosen to be an optical switch, such as an interferometric switch.

In one embodiment of the method, the component includes at least one Mach-Zehnder interferometer, and it forms an optical switch or a filter.

In one embodiment of the method, the optical switch is chosen to be a thermo-optic switch, where the modulators are heating elements that heat up the waveguides and the electric control signals consist of control voltage/current pulses that are directed to the heating elements, so that the amplitude level of control signals corresponds to the heating power induced in the heating elements by the control voltage/current pulses.

BRIEF DESCRIPTION OF DRAWINGS

In the following, the invention is explained in detail with the description of embodiments and with reference to the accompanying drawings, where.

DETAILED DESCRIPTION OF THE INVENTION

Figure 1:
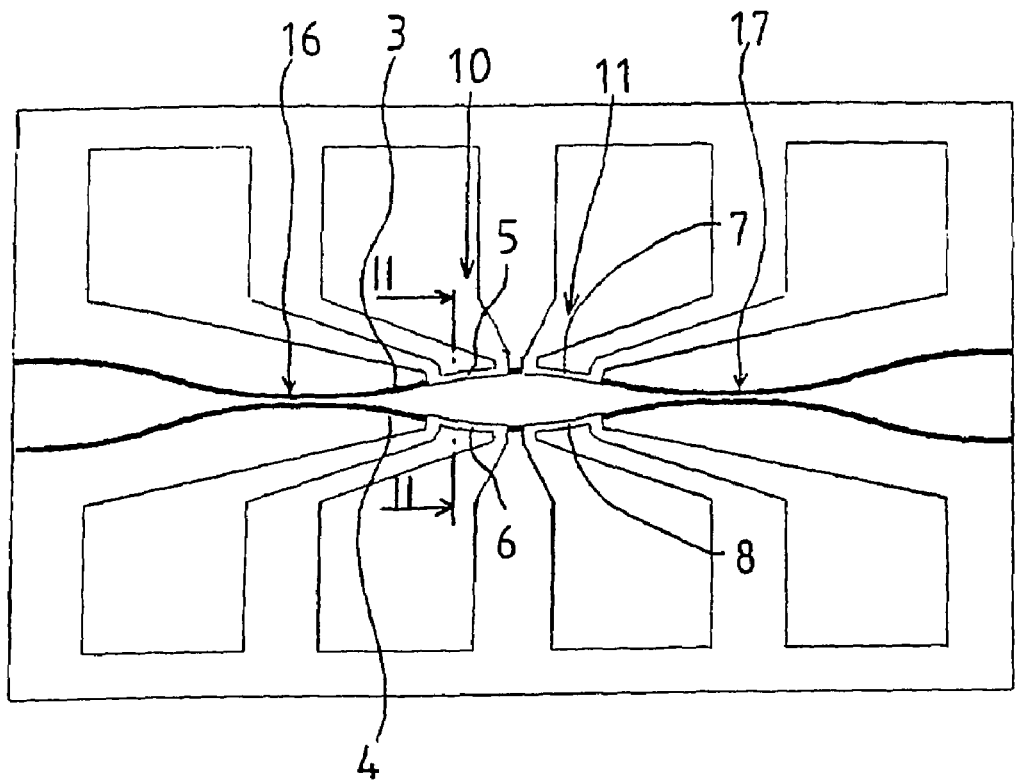
FIG. 1 represents a previously known thermo-optic 2×2 switch based on a Mach-Zehnder interferometer as seen from the top and as appropriately magnified.
Figure 2:
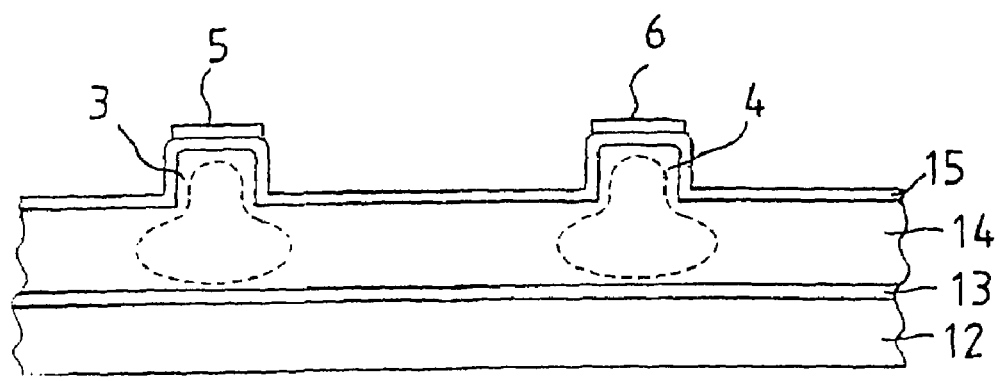
FIG. 2 represents a magnified cross-section II-II from FIG. 1.

The method of the invention is tested by applying thermo-optic modulation to a 2×2 MZI-switch based on SOI waveguides. Such a known switch is presented in FIGS. 1 and 2. In the following, the modulation principle is mostly described in the context of this particular application. The phase difference modulation method of the invention can, however, be also applied in the context of many other waveguide structures (such as glass and compound semi-conductor waveguides), optical components (e.g. 1×1 switches/modulators and filters) and modulation mechanisms (e.g. electro-optic).

Figure 3:
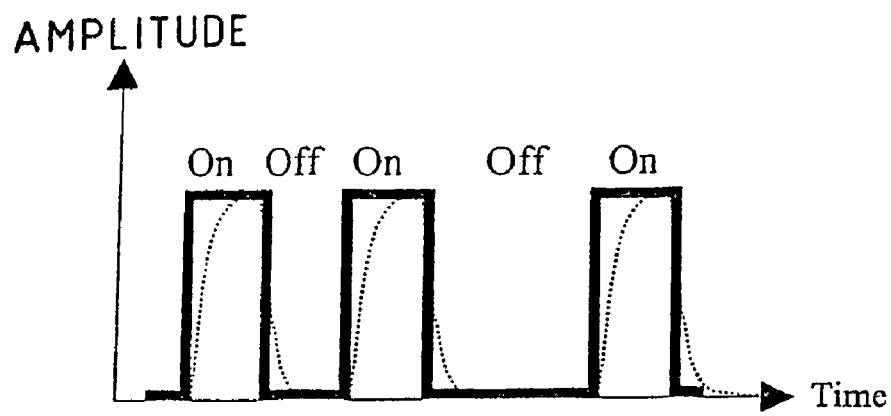
FIG. 3 schematically represents one known method for modulating the phase difference between two waveguides, namely the amplitude of a control signal as a function of time, when only one of the two adjacent waveguides is modulated with an electric control signal, which has a substantially rectangular shape, FIG. 4 schematically represents another known method for modulating the phase difference between two waveguides, namely the amplitude of a control signal as a function of time, when only one of the two adjacent waveguides is modulated with an electric control signal, which substantially consists of two rectangular parts, FIG. 5 schematically illustrates the amplitudes of control signals (e.g. heating powers or control voltages) as a function of time during the rise (off→on) and fall time periods (on→off) between on and off states, according to the method of the invention, FIG. 6 schematically illustrates the refractive indices (or corresponding temperatures that have a direct effect on the refractive indices) that are obtained with control signals, similar to those in FIG. 5, as a function of time during the rise and fall time periods, when it has been assumed that there is no significant delay between the electrical and optical signals, FIG. 7 schematically illustrates the phase difference between the two waveguides as a function of time during the rise and fall time periods, corresponding to FIGS. 5 and 6.
Figure 4:
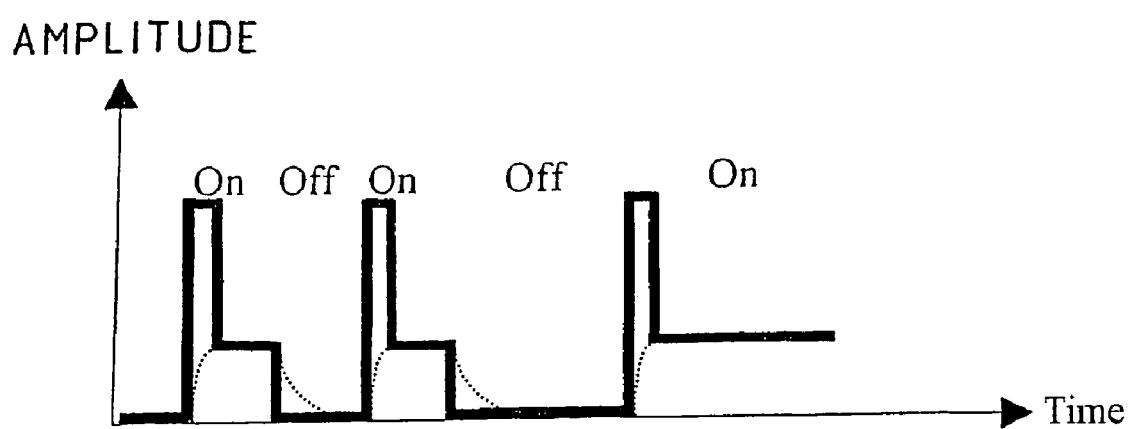

As already noted above, in traditional phase difference modulation only the first control signal, or a corresponding control voltage (or current), is changed, as illustrated in FIGS. 3 and 4. A change in the control signal amplitude induces a change in the optical length difference (and phase difference) from one value to another, while this resulting change stabilises exponentially.

An example of the modulation principle of the invention is schematically presented in FIGS. 5-7. In FIG. 5 thick black line A represents changes in the first control signal 1 that controls the refractive index of the first waveguide 3 between different amplitude levels as a function of time. FIG. 5 shows as if the setting of the control signal amplitudes to different amplitude levels would take place in a rectangular and step-wise manner, which represents a certain kind of theoretically ideal control. As can be seen from FIGS. 8 and 9, which represent the real experimental work, the control signal pulses are, in practise, somewhat rounded and, furthermore, the control signals can also intentionally consist of oblique or curved parts. Therefore, it is clear to a any expert in the field that the principle of the invention is not limited to any particular shapes of the control signal, such as rectangular pulses. Dashed line B represents the changes in the second control signal 2 that controls the refractive index of the second waveguide 4 between different amplitude levels as a function of time. FIG. 6 illustrates the changes of the refractive indices in the first and second waveguides as a function of time. Curve C represents refractive index changes in the first waveguide 3, while curve D represents refractive index changes in the second waveguide 4. Temperature changes in the waveguides behave similarly with the refractive index changes. FIG. 7 represents changes of the phase difference between the first and second waveguide 3 and 4 as a function of time.

During switching periods the objective is to change the phase difference between the waveguides as fast as possible to the desired value by adjusting the optical lengths of both waveguides separately and by shaping the control signals within the switching periods (rise and fall). According to the invention, both rise and fall time period is accelerated with respect to the control methods illustrated in FIGS. 3 and 4. So called off-state biasing (or preheating) is used, so that during an off-state both waveguides are being heated and the heating power levels (or amplitudes) of control signals 1 and 2 are set to the first amplitude level I.

From FIGS. 5-7 it can be seen that the rise time is being accelerated by raising the heating power of the first waveguide first as high as possible and by simultaneously dropping the heating power of the second waveguide to zero. When approaching the target phase difference value the heating power of the first waveguide is lowered. For producing a maximally step-wise phase difference change the heating power of the first waveguide can be temporarily dropped to zero after the high peak. When the target phase difference has been reached the heating power of the first waveguide is adjusted so that phase difference between the wave guides remains at its target value while both waveguides cool down towards their target temperatures. At the end of the rise time period the heating power of the first waveguide is set to its target value for the on-state and the heating power of the second waveguide is set either to zero or to a small so called on-state bias value. In some cases the rise time can be further shortened by rising the temperature of the first waveguide rapidly so high that the phase difference tends to pass its target level. This overshoot can be compensated by directing a heating pulse (or pulses) to the other waveguide at an appropriate moment. Then the phase difference reaches its target level as fast as possible, and then both waveguides cool down towards their own target temperatures for the on-state, while maintaining a constant phase difference. Cooling down to the ambient temperature follows an exponential stabilisation curve, so a small on-state heating bias in the second waveguide allows a faster attainment of the equilibrium. The heating bias is naturally not set on until the corresponding target temperature is reached. Then the temperature of the second waveguide cools down freely (without heating) towards a virtual target level, namely the temperature that is reached when the second waveguide is not heated for a very long time, until the temperature enters the vicinity of its real target level. Then the second waveguide is again heated so that its temperature settles to its real target level as fast as possible. This avoids the very slow last part of the exponential temperature stabilisation.

According to a more general explanation, with reference to FIG. 5, during the rise time period the amplitude of the first control signal 1 is raised from its off-state start level, namely the first amplitude level I, which is different than zero, to a fourth amplitude level IV, which is substantially higher than the final on-state target level, namely the second amplitude level II. Simultaneously, the amplitude of the second control signal 2 is lowered from its off-state start level, namely the first amplitude level I, to a fifth amplitude level V, which is zero in this example. From FIG. 6 it can be seen that in the off-state the refractive indices have a common and constant value, but during the rise time period the refractive index C of the first waveguide 3 is increasing and the refractive index D of the second waveguide 4 is decreasing, in which case the phase difference between the waveguides is increasing. The fourth amplitude level IV of the first control signal 1 can be set to be so high that the phase difference clearly tends to rise above the predetermined phase difference target value, which leads to a so-called overshoot, as is pointed out with an arrow in the refractive index curve C of the first waveguide in FIG. 6. For compensating the overshoot, the amplitude of the second control signal 2 can be raised to a sixth amplitude level VI, which is higher than the target level for the amplitude of the second control signal 2, namely the third amplitude level III. On the other hand, although the overshoot of the first waveguide would not be compensated by the second control signal 2, a small overshoot in the first waveguide's refractive index can be used to compensate for the slow exponential stabilisation of the second waveguide's refractive index at the last part of the rise time period (not illustrated in FIGS. 5-7). The amplitude of the first control signal 1 is set to a seventh amplitude level VII, namely to zero, before it is set to its target value, namely the second amplitude level II. The compensation is pointed out with an arrow in the refractive index curve D of the second waveguide. At the end of the rise time period the amplitude of the first control signal 1 is set to its target level, namely the second amplitude level II, and the amplitude of the second control signal 2 is set to its on-state target level, namely the third amplitude level III. From FIG. 6 it can be seen that in the on-state the refractive index of the first waveguide 1 (curve C) has its higher constant value and the refractive index of the second waveguide 2 (curve D) has its lower constant value, so that the phase difference between them is constant, as is presented in FIG. 7 by curve E which represents the phase difference.

In a similar manner, the fall time of the phase difference can be reduced by directing a heating pulse to the second (colder) waveguide at the same as the heating of the first waveguide is stopped so that it can cool down towards its constant off-state value. The objective is to raise the temperature of the second waveguide to a common value with the first waveguide's temperature as fast as possible, and then to let them cool down together towards their common and constant off-state temperature (see FIG. 6). According to the invention, the off-state biasing significantly accelerates the settling of the temperatures. Again, the heating bias is not turned on until the constant target temperatures are reached.

According to a more general explanation, with reference to FIG. 5, during the fall time period of the phase difference, the amplitude of the first control signal 1 is lowered from its on-state start level, namely the second amplitude level II, to an eight amplitude level VIII, which in this case zero. Simultaneously, the amplitude of the second control signal 2 is raised from its start level, namely the third amplitude level III, to a ninth amplitude level IX, which is substantially higher than the target level, namely the first amplitude level I. Before the amplitude of the second control signal 2 is set to its off-state target level, namely the first amplitude level I, the amplitude of the second control signal 2 is lowered from the ninth amplitude level IX to a tenth amplitude level X, which is in this case zero. Then the amplitude of the first control signal 1 and the second control signal 2 are set to their common target level, namely the first amplitude level I. The resulting effects in the refractive index changes can be seen from FIG. 6. In the beginning of the fall time period the refractive index C of the first waveguide 3 starts to drop from its higher constant on-state value and simultaneously the refractive index D of the second waveguide 4 starts to rise from its lower on-state constant value. When the curves C and D meet, the refractive indices are equal and the phase difference is zero, as can be seen from the phase difference curve E in FIG. 7. The waveguides cool down equally fast, so that their refractive indices also decrease equally fast towards the off-state constant value.

With respect to known methods, the modulation method of the invention enables significantly shorter rise and fall times for the phase difference changes. The phase difference reaches its target values very fast and by using appropriate heating biases the waveguide temperatures stabilise to their constant values almost as fast. If there is not enough time for the temperatures to settle between the rise and fall times, then the temperature of one or both waveguides can start to slowly drift to a harmfully high level (see FIGS. 6 and 7). If the settling of the temperatures limits the frequency of the phase difference modulation clearly more than the actual rise and fall times of the phase difference, then the frequency cannot be raised to the limits posed by the rise and fall times in a straight-forward manner. On the other hand, in such a case the pulse shapes are clearly better, namely more rectangular, with respect to traditional modulation. This, on the other hand, makes it feasible to place at least two or more phase difference modulators successively. Then they can operate in turn and, thus, enable double or multiple modulation frequency, depending on the number of modulators. For example, in the thermo-optic switch illustrated in FIG. 1 there are two successive phase difference modulators 10 and 11, which both include a pair of adjacent heating elements 5, 6 and 7, 8 for waveguides 3 and 4. The switch is operated between the on- and off-states by using modulators in turn so that the first has the time to cool down while the second is being operated.

Any desired number of modulators can be arranged successively and they can be either identical or dissimilar. The modulators can be operated in turn. It is possible to realise only some of intended successive phase difference changes with control signals associated with one modulator and to realise the other phase difference changes with control signals associated with one or several other successively arranged modulators so that the phase difference changes caused by the different modulators sum up, in which case the next phase difference change can be implemented with the next modulator as soon as the previous phase difference change is obtained, although the refractive indices of the waveguides in the previous modulator have not yet settled to their target levels.

If, for example, the thermal insulation of the waveguides is improved, then the fall time of a waveguide's temperature change can become significantly longer than the rise time. A well insulated silicon core naturally heats up faster than it cools down. By implementing the optimisation of the optical signal's fall time according to the invention one can make both the optical rise and fall time very short, but the stabilisation of the waveguide temperatures to values corresponding to static on/off-states may take a long time after the fall time. This settling time limits the continuous operating frequency because after a fast fall it is still necessary to have a long wait before the next rise can be implemented. If this wait is skipped, then a continuous back and forth operation rises the waveguide temperatures higher and higher, until the switch no longer operates in a desired manner. If the temperatures are given to settle, then the optical pulses (output signals) are still very rectangular at the maximum operating frequency. In traditional modulation, the rising of the frequency usually makes the pulses more round and reduces the range of signal variation until at a certain maximum frequency the pulses are so poor that the frequency can no longer be raised. The rectangular characteristic of the pulses at the maximum frequency can be exploited so that two or several modulators are arranged successively. In the case of two modulators, for example, they can implement the intended phase difference changes in turn and, thus, double the maximum operating frequency. The maximum number of successive modulators depends on the rectangular characteristic of the optical response of one modulator (rise-, fall- and settling times) and a higher number of modulators would make the signal worse than allowed (cf. traditional modulation).

Long-term power consumption can be reduced and phase difference changes can be accelerated in case of need, when at least two successive modulators are mutually different so that the first modulator is significantly faster and consumes more power than the second modulator, so that the first modulator is used for implementing fast and/or successive phase difference changes, and the second modulator is used for implementing slow and/or single phase difference changes and long static operating states, so that the average power consumption is significantly smaller than what can be obtained by using only the first modulator, and the maximum modulation speed is significantly higher than what can be obtained by using only the second modulator. When the optical signal is to be held constant for longer periods of time, only the slow and low-power modulator is used to maintain the desired phase difference. If the rise and/or fall time of the slow modulator is significantly shorter than the settling time, then this low-power modulator can also be used to implement single phase changes, and only several successive changes are implemented with the high-power modulators. This way the long-term average power consumption can be very small, although the modulator can also produce very fast and continuous modulation (with temporarily higher power consumption) when needed.

Transitions between the use of fast and slow modulators can be realised either abruptly or very slowly. In both cases, the phase difference change induced by a modulator is, for example, 0→180° for one modulator and 180→0° for the second, so that the total phase difference stays constant. During an abrupt transition the optical signal may temporarily weaken, but this is not harmful if it is combined with a simultaneous change of the total phase difference.

Changes of the phase difference can be further optimised so that the control signals are optimised during the rise and/or fall time periods so that they depend, not only on the start and target levels of the given intended phase difference, but also on at least one phase difference level that precedes the start level and/or succeeds the target level of the phase difference, so that the optimisation takes into account such potential settling time(s) that immediately precede and/or succeed the given phase difference change, and during which settling time(s) the phase difference has already reached its target value, while the refractive indices of the waveguides have not yet settled.

For example, in a thermo-optic component the heating signals between two bits can be controlled with four alternative ways depending on the different bit sequences (00, 11,01,10). The alternatives can be named as follows: off (0→0), on (1→1), rise (0→1) and fall (1→0). The heating period corresponding to a bit also depends on the previous bit, namely the start state of the modulator. In traditional modulation the control is based only on one bit (0,1), that is, usually by turning the heating of the second waveguide in turn on (1) and off (0). Using two bits instead of one and by optimising the fine structures of the rise/fall time periods, the speed can be significantly increased with respect to traditional modulation, but at the same time the power consumption increases and some kind of control logic (electronics or a computer program) is needed between the bit stream (or similar) and the heating signals. By increasing the number of bits that effect a certain rise and/or fall time period above two, it is possible to further accelerate the operation of a modulator or to reduce the power consumption.

The modulation method according to the invention somewhat increases the electric power consumption of the component, especially during the rise and fall time periods, and requires somewhat more complicated control electronics than conventionally. These are, nevertheless, rather small problems compared to the significant increase in the speed. The power consumption can also be reduced by reducing the size of the waveguide and by improving thermal insulation (with insulation grooves).

EXAMPLE

The method according to the invention is tested in practise with thermo-optic switches based on silicon-on-insulator (SOI) technology. The operating frequency of the switches has already been raised above 160 kHz, while commercial thermo-optical switches usually operate at a 1 kHz frequency, at the most.

The extinction ratio of the switches is not perfect due to their non-ideal structure (r≠1). Additionally, switches are polarisation dependent because of the thermal oxide used as a cladding. These factors limit the optical characteristics of the switches, mostly their extinction ratio, but they have not much of an interaction with the used modulation principle. Therefore, the optical characteristics of the switches can be easily improved without substantially influencing their speed.

With traditional modulation methods (cf. FIGS. 3 and 4) the switches have been successfully operated with a maximum frequency of approx. 10 kHz, whereupon the shape of the pulses already starts to significantly degrade. By using the modulation method according to the invention, the switches have been successfully operated at a frequency above 160 kHz, which is at least one (or perhaps even two)

orders of magnitude faster than comparable commercial thermo-optical switches. The required electrical signals have been obtained with a simple and inexpensive apparatus.

Figure 8:
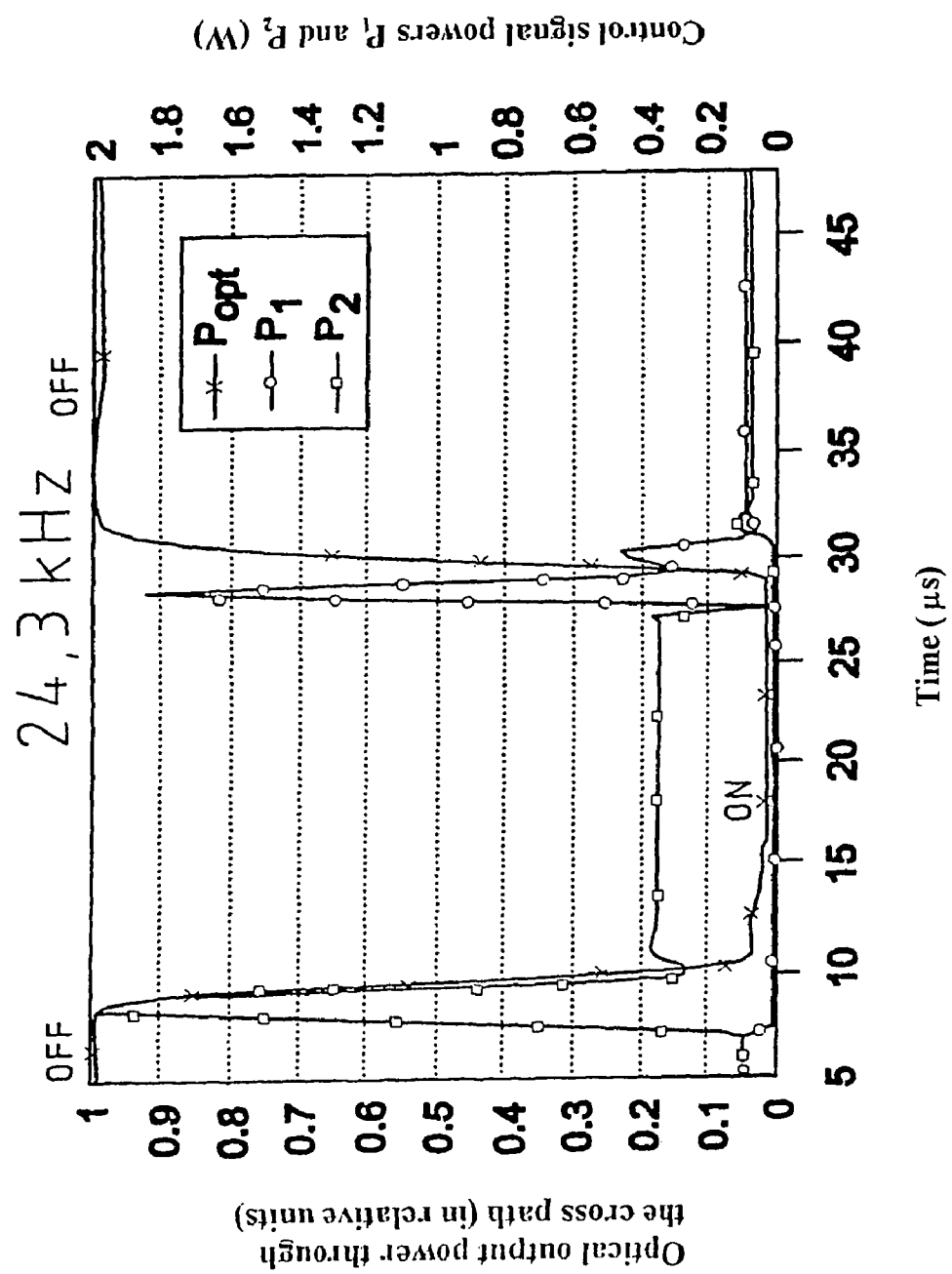
FIG. 8 represents experimental results obtained, with the method of the invention, from a thermo-optical switch at a frequency of 24,3 kHz, the Figure showing the measured output power $P_{opt}$ of the optical signal, the amplitude of the first waveguide's control signal, namely the heating power $P_1$, and the amplitude of the second waveguide's control signal, namely the heating power $P_2$, as a function of time.
Figure 9:
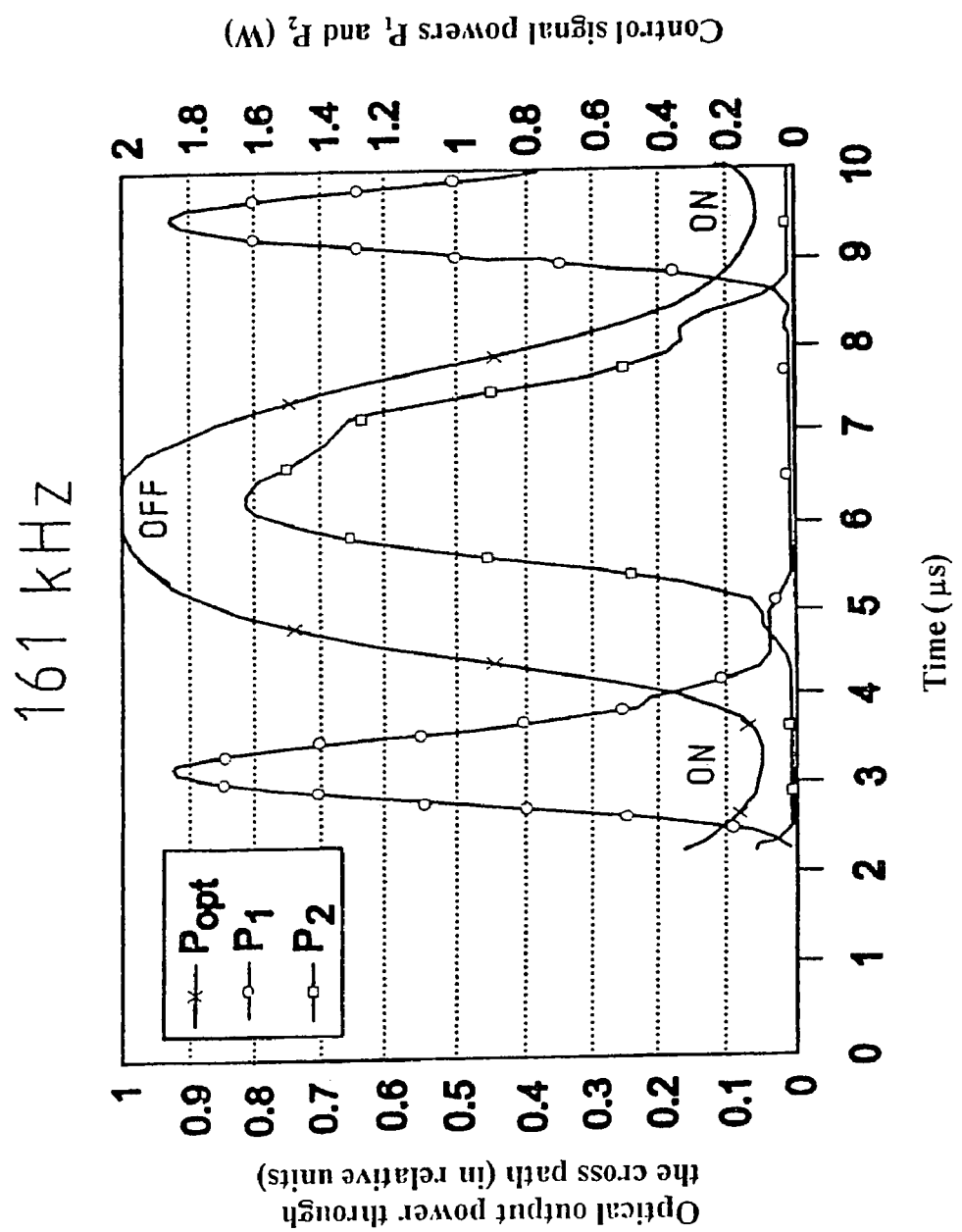
FIG. 9 represents experimental results obtained, with the method of the invention, from a thermo-optical switch at a frequency of 161 kHz, the Figure showing the measured output power $P_{opt}$ of the optical signal, the amplitude of the first waveguide's control signal, namely the heating power $P_1$, and the amplitude of the second waveguide's control signal, namely the heating power $P_2$, as a function of time.

FIGS. 8 and 9 represent measurement results obtained at frequencies 24,3 kHz and 161 kHz, which clearly verify the practical functionality of the modulation principle. At the 161 kHz frequency (FIG. 9) the minimum and maximum values of the optical signal still depart less than 5% of those optimum values that are obtained with very slow traditional modulation. The amplitudes of the control signals for the waveguides, namely the heating powers, are adjusted so that the optical signal P opt has been made to change back and forth as fast as possible. In the example depicted in FIG. 8, the switch has been kept either in on- or off-state for 18 μs between the approx. 2 μs long rise and fall time periods. In the example depicted in FIG. 9, the switch has been kept either in on- or off-state for 1 μs between the approx. 2 μs long rise and fall time periods.

In FIG. 8, curves P1 and P2 represent changes of the electrical power conducted to the heating resistors of the waveguides, i.e. heating power, for changing the state of the switch between on- and off-states. In the off-state preheating of both waveguides is used, so that the heating powers P1 and P2 are approximately equal. When the switch is guided from the off-state to the on-state, a high power peak is formed into the curve P2 in the beginning of the rise time period and, at the same time, the heating power P1 is dropped to zero. The power peak and the simultaneous dropping of the heating power P1 to zero causes a steep fall in the optical power P opt, i.e. the switch shifts fast from the off-state to the on-state. In the on-state the heating power P2 is adjusted to a value which is enough to maintain the on-state. The fall time period from the on-state to the off-state, on the other hand, starts with a high power peak of the heating power P1, so that P2 is at the same time dropped from its on-state power to zero. Then the optical power P opt rises steeply, until the off-state is reached. Heating powers P1 and P2 are set back to their constant off-state values.

A similar operation can be seen in FIG. 9, where, though, the optical signal P opt follows the changes of the heating powers P1 and P2 with a delay, because of the time elapsed during heat transfer and measurement of the optical output.

Heating power signals P1 and P2 of both waveguides, as seen in FIGS. 8 and 9, are quite non-ideal when compared with the schematic illustration in FIG. 5, which is due to the simplicity of the electrical components. The advantages of the modulation principle according to the invention have, though, been clearly demonstrated with these very inexpensive components. The total power consumption is mostly determined by the fast power peaks used to change the state of the switch. Therefore, the less time the switch is held in an on- or off-state between the actual rise and fall times, the higher the power consumption is. Average power consumptions corresponding to FIGS. 8 and 9 are approx. 0,36 W (24,3 kHz) and 0,81 W (161 kHz), respectively.

The invention is not limited to concern the above presented embodiment examples only, but many variations are possible within the inventional idea determined by the claims.

The invention claimed is:

1. A method for controlling an optoelectronic component during a rise time period with control signals, in which component there are at least two waveguides optically coupled to each other, the first waveguide (3) and the second waveguide (4), which form tracks to an optical signal, and in the beginning of which rise time period both control signals are on a common start level, namely on the first amplitude level (I), which is clearly higher than zero, so that the refractive indices of the waveguides (3, 4) are equal and the phase difference between them is zero, and at the end of which rise time period the first control signal is on its target level, namely on the second amplitude level (II), which is clearly higher than the start level, and the second control signal is correspondingly on its own target level, namely on the third amplitude level (III), which is clearly lower than the start level, so that the refractive indices of the waveguides (3, 4) are unequal and there is a predetermined phase difference between them, and the length of which rise time period is limited by the time required for generating and stabilizing a phase difference change between the waveguides, and in which method the rise time period is shortened by adjusting the control signals between their start and target levels in an appropriate manner, characterized in that for shortening the rise time period the second control signal is first lowered to a fifth amplitude level (V), which is zero or substantially lower than the third amplitude level (III), and simultaneously the first control signal is set to a fourth amplitude level (IV), which is clearly higher than the second amplitude level (II), and finally both control signals are set to their target level, and during which rise time period the control signals are adjusted so that in the last part of the rise time period the phase difference between the waveguides is already substantially settled to its target value, while the refractive indices of the individual waveguides are still clearly changing towards their target values.

2. Method according to claim 1, characterized in that for obtaining a more step-wise phase difference change, the first control signal is set from the fourth amplitude level (IV) to a seventh amplitude level (VII), which is lower than the second amplitude level (II), before it is set to the second amplitude level (II).

3. Method according to claim 2, characterized in that the seventh amplitude level (VII) is chosen to be substantially equal with the fifth amplitude level (V).

4. Method according to claim 1, characterized in that for shortening the rise time period, the fourth amplitude level (IV) of the first control signal is chosen so high that the phase difference clearly tends to rise above the predetermined target value of the phase difference, so that a so called overshoot of the refractive index is formed, and for compensating the overshoot the amplitude of the second control signal is raised to a sixth amplitude level (VI), which is higher than the fifth amplitude level (V).

5. Method according to claim 1, characterized in that for shortening the rise time period, the target level of the second control signal, namely the third amplitude level (III), is chosen to be higher than zero.

6. A method for controlling an optoelectronic component during a fall time period with control signals, in which component there are at least two waveguides optically coupled to each other, the first waveguide (3) and the second waveguide (4), which form tracks to an optical signal, and at the beginning of which fall time period the first control signal is on its start level, namely on the second amplitude level (II), which is clearly higher than the target level, and the second control signal is correspondingly on its own start level, namely on the third amplitude level (III), which is clearly lower than the target level, so that the refractive indices of the waveguides (3, 4) are unequal and there is a predetermined phase difference between them, and in the end of which fall time period both control signals are on a common target level, namely on the first amplitude level (I), which is substantially higher than zero, so that the refractive indices of the waveguides (3, 4) are equal and the phase difference between them is zero, and the length of which fall time period is limited by the time required for generating and stabilizing a phase difference change between the waveguides, and in which method the fall time period is shortened by adjusting the control signals between their start and target levels in an appropriate manner, characterized in that for shortening the fall time period the first control signal is first lowered to an eighth amplitude level (VIII), which is zero or substantially lower than the first amplitude level (I), and simultaneously the second control signal is set to a ninth amplitude level (IX), which is substantially higher than the first amplitude level (I), and finally both control signals are set to the first amplitude level (I), and during which fall time period the control signals are adjusted so that in the beginning of the rise time period the refractive index difference between the waveguides decreases fast to zero and during the last part of the fall time period it substantially remains at zero, so that the phase difference between the waveguides is already substantially settled to zero, while the refractive indices of the individual waveguides are still clearly changing towards their common target value.

7. Method according to claim 6, characterized in that for obtaining a more step-wise phase difference change, the second control signal is set from the ninth amplitude level (IX) to the tenth amplitude level (X), which is lower than the first amplitude level (I), before it is set to the first amplitude level (I).

8. Method according to claim 7, characterized in that the tenth amplitude level (X) is chosen to be substantially equal with the eighth amplitude level (VIII).

9. Method according to claim 1, characterized in that at least one of the following is chosen to be zero: third amplitude level (III), fifth amplitude level (V), seventh amplitude level (VII), eighth amplitude level (VIII), tenth amplitude level (X).

10. Method according to claim 1, characterized in that the phase difference between the first and the second waveguide is modulated with two or several successive modulators (10, 11).

11. Method according to claim 10, characterized in that the modulators (10, 11) are controlled to operate in turn.

12. Method according to claim 11, characterized in that only some of the successively intended phase difference changes are implemented with control signals corresponding to one modulator (10) and other phase difference changes are implemented with the control signals of the following one or several modulators that are arranged successively with respect to the aforementioned modulator (11) so that the phase difference changes caused by them sum up, so that the next phase difference change can be implemented with the next modulator as soon as the previous phase difference change is implemented, although the refractive indices of the waveguides of the modulator that implemented it have not yet settled to their target levels.

13. Method according to claim 1, characterized in that at least two successive modulators (10, 11) are mutually different so that the first modulator (10) is significantly faster and consumes more power than the second modulator (11), so that the first modulator is used for implementing fast or successive phase difference changes and the second modulator is used for implementing slow or single phase difference changes and for implementing long static operating states, so that the average power consumption is significantly smaller than by using only the first modulator and the maximum modulation speed is significantly higher than by using only the second modulator.

14. Method according to claim 1, characterized in that during their rise or fall time periods the control signals are optimized so that they depend, not only on the start and target state of the phase difference, but also on at least one phase difference change that precedes the start state or succeeds the target state of the phase difference, so that the optimization takes into account such potential settling time that immediately precedes or succeeds the given phase difference change, and during which settling time the phase difference has already reached its target value, but the refractive indices of the waveguides have not yet settled.

15. Method according to claim 1, characterized in that the predetermined target value of the phase difference is set to be about 180°.

16. Method according to claim 1, characterized in that the waveguides (3, 4) are arranged as waveguides on planar substrates.

17. Method according to claim 16, characterized in that the waveguides (3, 4) are chosen among:
   SOI (silicon-on-insulator) waveguides,
   glass waveguides,
   polymer waveguides,
   compound semiconductor waveguides.

18. Method according to claim 1, characterized in that the optoelectronic component is chosen to be an optical switch.

19. Method according to claim 1, characterized in that the optoelectronic component is chosen to be a component which includes one or several Mach-Zehnder interferometers, which forms an optical switch or a filter.

20. Method according to claim 1, characterized in that the optical switch is chosen to be a thermo-optic switch where the modulators (10, 11) are heating elements (5, 6, 7, 8) that heat the waveguides (3, 4) and electrical control signals consist of control voltage/current pulses directed to the heating elements, so that a control signal amplitude level corresponds to the heating power induced in the heating element by a control voltage/current pulse.

* * * * *